United States Patent [19]

Strassheimer

[11] Patent Number: 5,038,947

[45] Date of Patent: * Aug. 13, 1991

[54] SELF-STABILIZING BASE FOR PRESSURIZED BOTTLE

[75] Inventor: Herbert Strassheimer, Windermere, Fla.

[73] Assignee: Plasticon Patents, S.A., Geneva, Switzerland

[ * ] Notice: The portion of the term of this patent subsequent to Nov. 13, 2007 has been disclaimed.

[21] Appl. No.: 525,694

[22] Filed: May 21, 1990

Related U.S. Application Data

[63] Continuation-in-part of Ser. No. 397,970, Aug. 24, 1989, Pat. No. 4,969,563.

[51] Int. Cl.[5] .......................... B65D 1/02; B65D 1/42; B65D 23/00
[52] U.S. Cl. ...................................... 215/1 C; 220/606
[58] Field of Search ................ 215/1 C; 220/606, 609

[56] References Cited

U.S. PATENT DOCUMENTS

| | | | |
|---|---|---|---|
| 3,043,461 | 7/1962 | Glassco | 215/1 C |
| 3,881,621 | 5/1975 | Adomaitis | 215/1 C |
| 3,934,743 | 1/1976 | McChesney et al. | 215/1 C |
| 3,935,955 | 2/1976 | Das | 215/1 C |
| 4,108,324 | 8/1978 | Krishnakumar et al. | 215/1 C |
| 4,134,510 | 1/1979 | Chang | 220/606 X |
| 4,261,948 | 4/1981 | Krishnakumar et al. | 215/1 C X |
| 4,334,627 | 6/1982 | Krishnakumar et al. | 215/1 C |
| 4,355,728 | 10/1982 | Yoshino et al. | 215/1 C |
| 4,598,831 | 7/1986 | Nakamura et al. | 215/1 C |
| 4,603,831 | 8/1986 | Krishnakumar et al. | 215/1 C X |
| 4,620,639 | 11/1986 | Yoshino | 215/1 C |
| 4,749,092 | 6/1988 | Sugiura et al. | 215/1 C |
| 4,755,404 | 7/1988 | Collette | 220/606 X |
| 4,785,948 | 11/1988 | Strassheimer | 215/1 C |
| 4,865,206 | 9/1989 | Bemm et al. | 215/1 C |

FOREIGN PATENT DOCUMENTS

| | | | |
|---|---|---|---|
| 225155 | 6/1987 | European Pat. Off. | 215/1 C |
| 8185229 | 10/1983 | Japan | 215/1 C |
| 2146137 | 6/1987 | Japan | 215/1 C |
| 2235401 | 10/1987 | Japan | 215/1 C |
| 870497 | 8/1987 | PCT Int'l Appl. | 215/1 C |
| 2189214 | 10/1987 | United Kingdom | 264/532 |

Primary Examiner—Sue A. Weaver
Attorney, Agent, or Firm—Bachman & LaPointe

[57] ABSTRACT

A blow molded, biaxially oriented plastic container with a bottom portion including an axially, inwardly directed generally conical portion, a standing section on which the container rests, a heel portion joining the bottom portion and container body portion, and a hinge portion joining the conical portion and the standing section, wherein the wall thickness of the hinge portion is greater than the wall thickness of the heel portion.

9 Claims, 4 Drawing Sheets

SELF-STABILIZING BASE FOR PRESSURIZED BOTTLE

CROSS REFERENCE TO RELATED APPLICATION

This application is a continuation-in-part of U.S. patent application Ser. No. 397,970, Filed Aug. 24, 1989 now U.S. Pat. No. 4,969,563.

BACKGROUND OF THE INVENTION

This invention relates to thermoplastic containers for the retention of fluids under pressure, such as carbonated beverages and the like. These containers may be prepared from a perform or parison which may be injection molded, followed by blow molding said parison into a suitably shaped container. A typical thermoplastic material is poly (ethylene terephthalate) or PET, although others can be used.

The container configuration generally includes a neck portion with a cap-receiving means, a shoulder portion depending therefrom, a side wall or main body portion depending from the shoulder portion and a bottom wall joined to the side wall. In many of these containers the bottom wall has a champagne bottle bottom configuration with an internal, axially inwardly directed, generally conical part.

The bottom wall of these containers represents a weak part of the container. It is desirable to provide a bottom shape capable of serving as a stable bottom support.

Thus, beverage under pressure within the container has a tendency to deform the bottom wall, as for example everting the inwardly directed conical part to render the bottom wall unstable.

Many attempts have been made to overcome these problems while at the same time providing a construction which is inexpensive and economical to process. For example, U.S. Pat. No. 3,881,621 provides a ribbed strengthening at the bottom wall; however, this still provides insufficient strengthening. U.S. Pat. No. 4,134,510 provides a plurality of concentric annular strengthening ribs and a plurality of additional intersecting radial ribs in a complex and expensive procedure. U.S. Pat. Nos. 4,620,639, 4,261,948, 4,603,831, and 4,334,627 utilize a plurality of inwardly projecting rigid ribs so that the bottom wall is thicker at the ribbed portion than the remainder of the bottom wall; however, this results in a container having substantial and sharply defined differences in wall thickness with resultant sharp temperature differences in processing presenting difficult, processing control problems. U.S. Pat. No. 4,865,206 utilizes a plurality of wall portions extending downwardly from the bottom wall forming hollow legs extending below the bottom wall having planar feet which are inclined upwardly and inwardly from the outer edges of the feet. While most of the above improve the resistance to eversion, they are limited to configurations resulting in insufficient stability and insufficient compressive strength of the bottle.

U.S. Pat. No. 4,785,948, By Herbert Strassheimer, teaches the use of an improved plastic preform for forming blow molded plastic containers and resultant improved plastic containers wherein the container has a tubular body portion adjacent a bottom portion and extending onto the bottom portion having circumferentially spaced radially extending continuous alterations in wall thickness. The preform is characterized by the bottom structure thereof having a plurality of faces capable of forming a blow molded plastic bottle with a bottom portion having said circumferentially spaced radially extending continuous alterations in wall thickness with a regularly undulating cross section across the circumference thereof, wherein said alterations in wall thickness are progressive and gradual. While the teaching of U.S. Pat. No. 4,785,948 provides a stable and reinforced bottom wall configuration which is simple in construction and inexpensive to prepare and a preform which is similarly convenient and expeditious to prepare, such improvements are at times insufficient in the case of large bottles Thus, it is desirable to further improve the characteristics of the resultant container, especially the resultant bottom regions corresponding to the intersects of the said faces of the preform. It is highly desirable to enhance the properties at this region and to increase the stability of the filled and pressurized container.

It is therefore a principal object of the present invention to provide an improved plastic container having a reinforced bottom wall configuration, that is stable when filled with a beverage under pressure.

It is a further object of the present invention to provide an improved container as aforesaid which is simple in construction and inexpensive to prepare and which provides a stable base configuration.

Further objects and advantages of the present invention will appear hereinbelow.

SUMMARY OF THE INVENTION

In accordance with the present invention it has now been found that the foregoing objects and advantages may be readily obtained. The blow molded, biaxially oriented plastic container of the present invention comprises: a neck portion defining an opening; a tubular body portion depending therefrom; an integral bottom portion depending from the tubular body portion; an axially, inwardly directed, generally conical portion of said bottom portion, wherein said bottom portion includes a standing section on which the container rests in the upright condition; wherein said bottom portion includes a heel portion joining the standing section and the body portion and a hinge portion joining the conical portion and the standing section; said container having means including a hinge portion wall thickness greater than the heel portion wall thickness wherein said heel portion moves outward and downward upon pressurizing the container to provide a stable bottom portion. In accordance with the present invention both the heel portion and the conical portion have a radius of curvature with the ratio of the radius of curvature of the hinge portion to the radius of curvature of the conical portion varying from 0.75 to 2, and preferably from 1 to 1.6.

In a preferred embodiment, the hinge portion has a greater wall thickness than the body portion. Also, the conical portion includes an upper region and preferably the wall thickness of the hinge portion is greater than the wall thickness of the upper region of the conical portion. The heel portion is preferably thinner than the upper region of the conical portion.

It is particularly preferred to provide the container with continuous alterations in wall thickness with a regularly undulating cross section across the entire circumference of the inside wall face which is progressive and gradual, wherein said continuous alterations in wall thickness are provided on the tubular body portion adjacent the bottom portion and extending onto the bottom portion. The preform from which the container is prepared preferably has an outside wall face and an inside wall face, with the inside wall face of the tubular body portion adjacent the bottom structure and extending onto the bottom structure having a plurality of faces with terminal portions thereof and with scallop-shaped segments connecting the terminal portions of each face adapted to deform upon exposure to stresses prior to deformation of the faces and thereby become subject to an increased rate and degree of orientation. The thinner portions of the continuous alterations in wall thickness are preferably extended and thereby bi-axially oriented due to the aforesaid provision of the scallops in the preform. The foregoing features are described in co-pending U.S. patent applications Ser. No. 262,781 and Ser. No. 354,461.

In accordance with the provisions of the present invention, the foregoing container has enhanced stability, good strength characteristics and is simple, convenient and expeditious to prepare.

Further features and advantages of the container of the present invention will be discussed hereinbelow.

BRIEF DESCRIPTION OF THE DRAWINGS

The foregoing will be more readily apparent when considered in connection with the following illustrative examples wherein.

DETAILED DESCRIPTION

Figure 2:
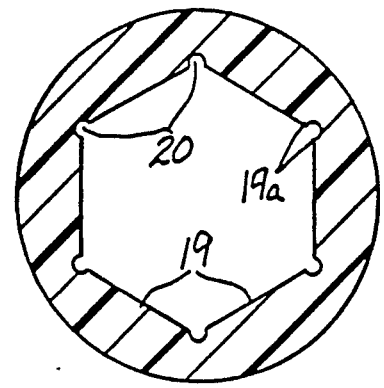
FIG. 2 is an enlarged sectional view along lines 2—2 of FIG. 1.
Figure 3:
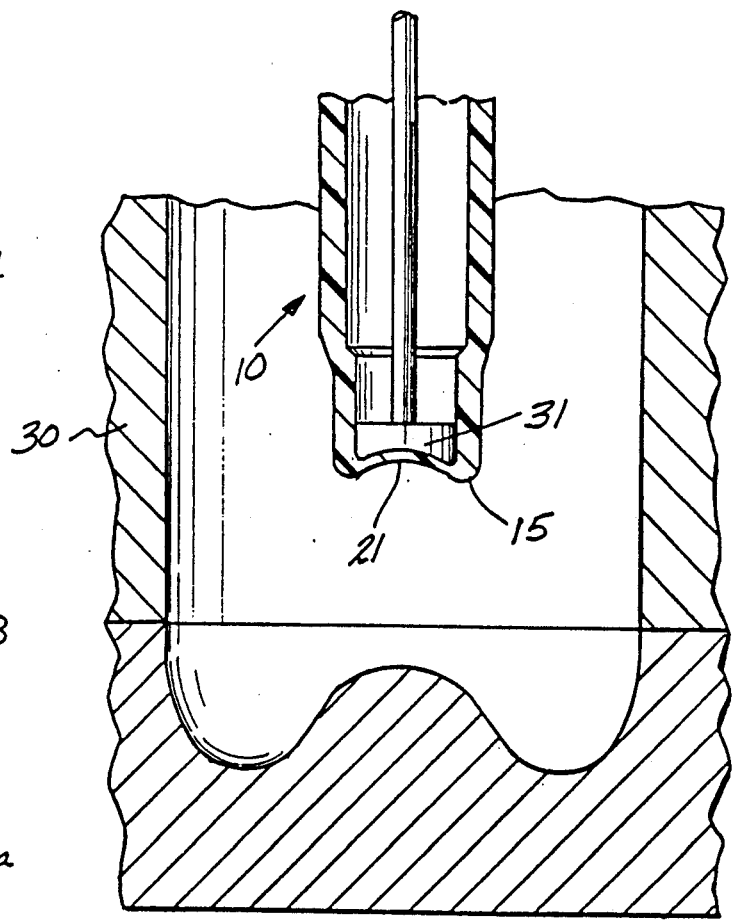
FIG. 3 is a partial sectional view taken through a mold for molding the container of the present invention and having associated therewith a preform similar to the preform of FIG. 1 which is to be stretched and blown therein to form a container of the present invention.

Referring now to the drawings in detail, a plastic parison or preform 10 is formed by injection molding from a synthetic resin which can be biaxially oriented, as for example poly (ethylene terephthalate). The preform 10 has a neck portion 11 defining an opening 12 and it may be provided with external threads 13 to serve as the site for attachment of a cap on the finished, blow molded plastic container. The preform 10 has a tubular body portion 14 depending from the neck portion 11 and an integral bottom structure 15 depending from the tubular body portion. The preform 10 has an outside wall face 16 and an inside wall face 17. The inside wall face 17 of the tubular body portion 14 is provided with a thickened portion 18 which extends onto bottom structure 15 and is characterized by a plurality of faces 19, which may be flat as shown or curved, with terminal portions thereof 19a. Scallop-shaped segments 20 connect the terminal portions of each face 19. Three or more of said flat or curved faces 19 may be used, although the hexagonal configuration of FIG. 2 is preferred. Alternately, for example, an octagonal configuration may readily be employed. The bottom structure 15 as shown in FIG. 1 may be flat or may be provided with an axially inwardly directed conical part 21 as shown in FIG. 3.

Compared to the preform typically used according to the known art, e.g. U.S. Pat. No. 4,785,948, the length "L" of thickened portion 18 is shortened and the depth of the scallop-shaped segments 20 may be decreased as well. The greater the length "L", the more does the thickened portion of the base of the bottle blown from the preform extend outward, to the side wall and thus, the less the same portion will be oriented, meaning undue brittleness. Similarly, the deeper the scallop 20, i.e., the thinner the wall at said scallops, the more orientation will be obtained at the bottle regions corresponding to the scallops.

Thus, in order to obtain a high degree of orientation at the heel 50 of the bottle, the length "L" is reduced so as to limit the corresponding thick portions of the base to a region well inward of the heel, see FIG. 6 and the discussion hereinbelow.

Figure 1:
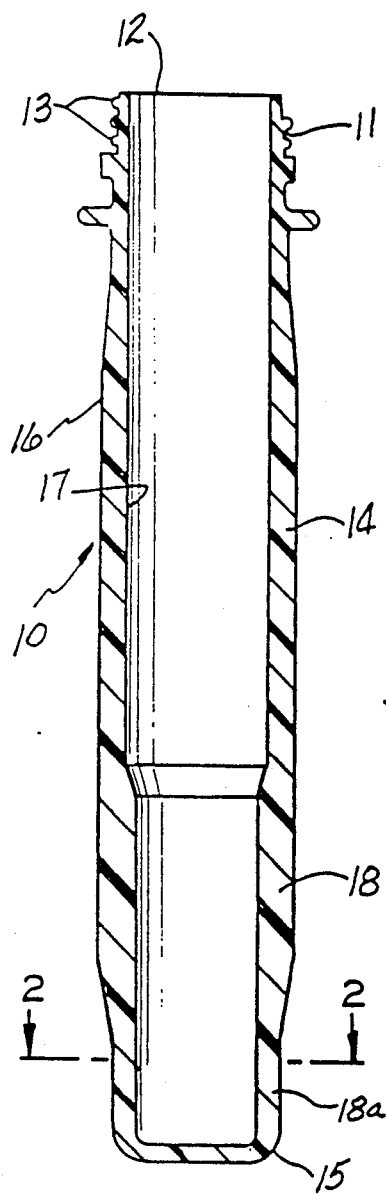
FIG. 1 is a sectional view of a preform for preparing the container of the present invention.

As shown in FIG. 1, thickened portion 18 includes a lower portion 18a adjacent the bottom structure having a wall thickness less than the wall thickness of the adjacent thickened portion 18. It has been found that this may be employed in order to save material costs without loss of necessary properties in view of the significant advantages obtained in accordance with the present invention. Alternately, if desired, external ribs may be provided on the preform as disclosed in the aforesaid U.S. Pat. No. 4,785,948.

Figure 4:
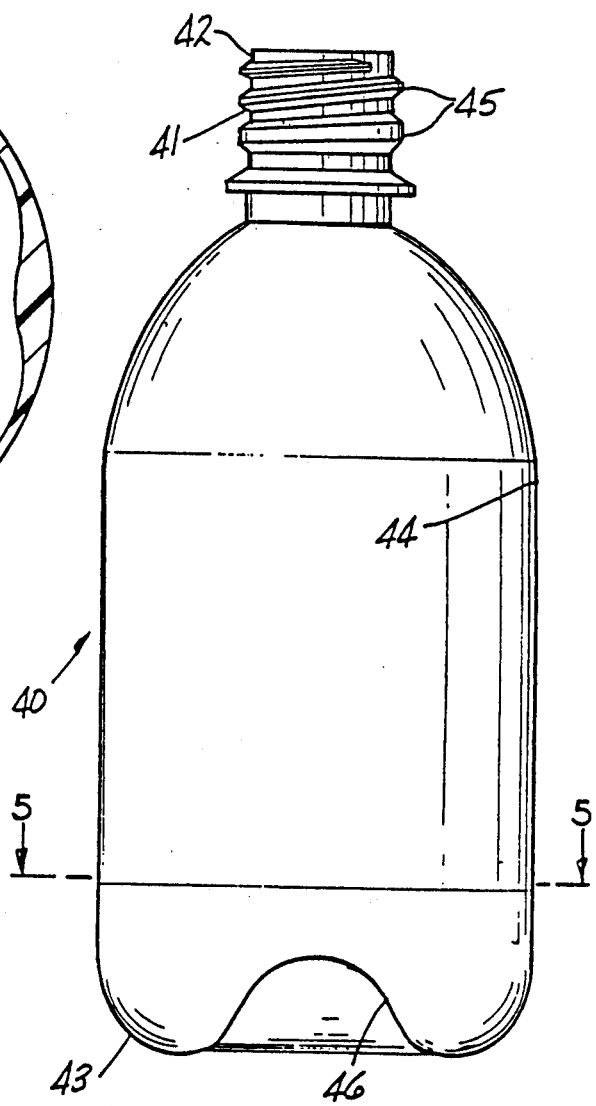
FIG. 4 is an elevational view of a container of the present invention formed in FIG. 3.

The thus formed preform is brought to a temperature at which blow molding can be accomplished which may be done by heating a previously formed parison or forming the hot parison in line with the blow molding operation and suitably adjusting the temperature thereof. The heated preform is then placed in a blow mold having the configuration of the desired container, to be described in greater detail below, as blow mold 30 shown in FIG. 3 and while blowing compressed air thereinto, the interior side of bottom portion 15 is pushed down by movable means 31 to effect biaxial orientation. The blow mold 30 shown in FIG. 3 has an internal configuration which allows the formation of a plastic container 40 of the present invention (see FIG. 4) having a desired configuration as set forth herein.

Thus, blow molded plastic container 40 is formed having a neck portion 41 defining an opening 42, a bottom portion 43, a tubular body portion 44 interconnecting the neck portion 41 and the bottom portion 43. Neck portion 41 is provided with external threads 45 to serve as the site for attachment of a cap on the container, as with preform 10. The bottom portion 43 has an internal, axially inwardly directed generally conical part 46.

Figure 5:
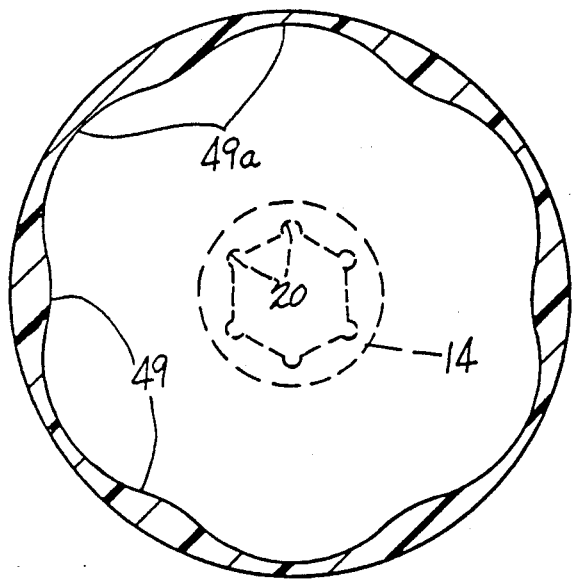
FIG. 5 is an enlarged sectional view taken along lines 5—5 of FIG. 4, with the corresponding sectional view of FIG. 2 superimposed therein in phantom.

FIG. 5 shows a preferred embodiment of the present invention wherein the flat or curved faces form a hexagonal configuration. Scallop-shaped segments 20 form the thinner portions 49a of the regularly undulating cross-sectional configuration of the bottom portion of the container with 49 representing the thicker portions. Said segments may constitute parts of circles, to facilitate manufacture.

Figure 6A:
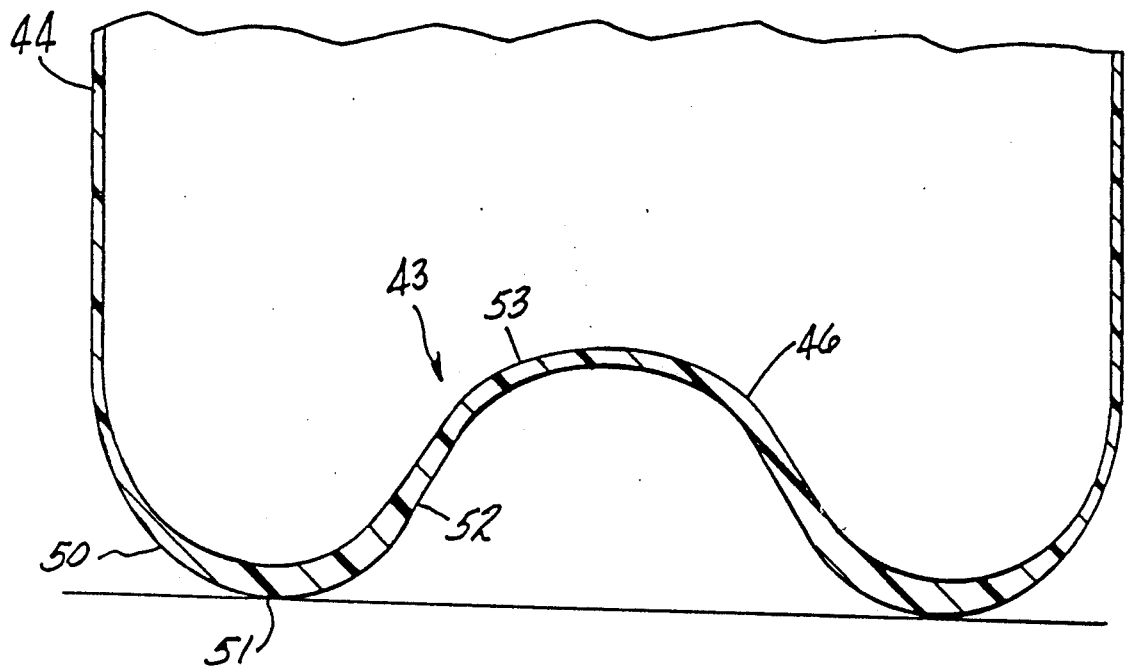
FIG. 6A is a partly schematic, enlarged sectional view of the bottom portion and adjacent tubular body portion of the container of FIG. 4 in the empty condition.
Figure 6B:
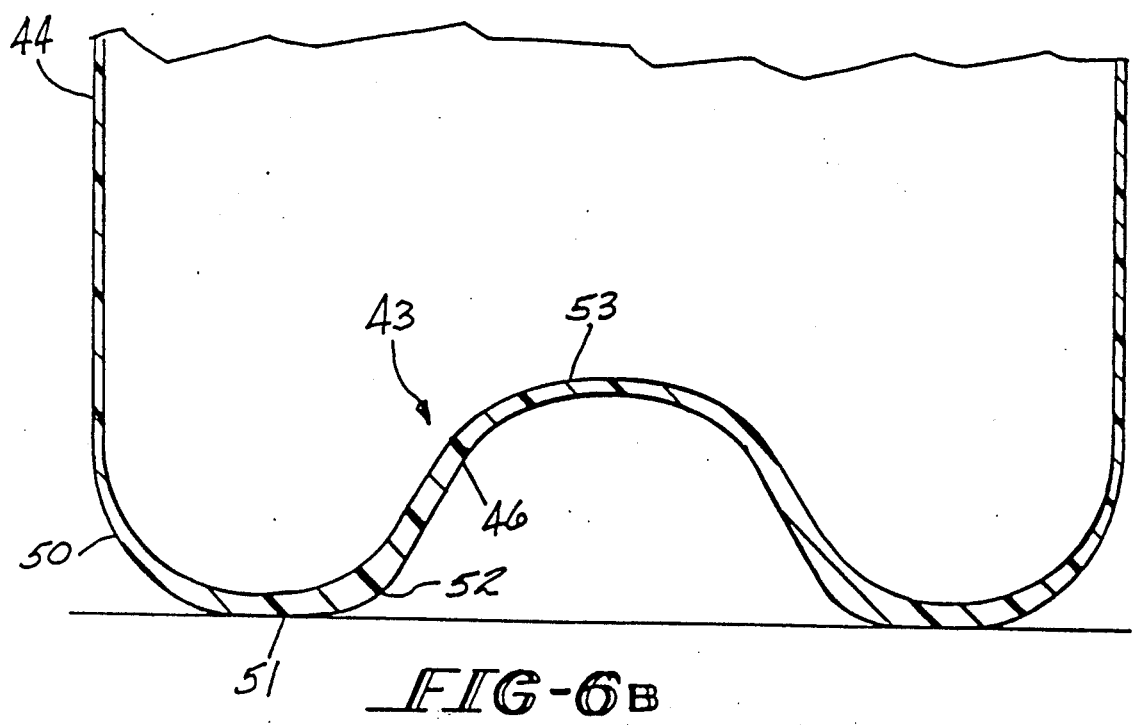
FIG. 6B is a view similar to FIG. 6A with the container in the pressurized condition.

FIGS. 6A and 6B represent partly schematic, enlarged sectional views of the bottom portion 43 and adjacent tubular body portion 44 of the container 40, wherein FIG. 6A shows the container in the empty condition and FIG. 6B shows the container in the pressurized condition. The heel portion 50 of bottom portion 43 joins the bottom portion to the body portion 44. The bottom portion also includes a standing section 51 on which the container rests in the upright condition, and a hinge portion 52 joining the conical portion 46 to the standing section.

In accordance with the present invention, the wall thickness of the hinge portion 52 is greater than the wall thickness of the heel portion 50. Also, the wall thickness of the heel portion 50 is greater than the wall thickness of the body portion 44. Conical portion 46 includes an upper region 53, with the wall thickness of the hinge portion 52 being greater than the wall thickness of the upper region 53. The wall thickness of the heel 50 may be thinner than the wall thickness of the upper region. These relationships are shown schematically in FIG. 6A and are maintained in the pressurized container of FIG. 6B. Illustrative wall thickness ranges in the container of FIG. 6A are: heel—0.35 mm; hinge—3.2 mm; upper region of conical portion—2.2 mm; and body portion—0.25 mm.

Thus, as clearly shown in FIG. 6, the hinge portion shows substantial thickening over the heel portion. In accordance with the configuration of the aforesaid U.S. Pat. No. 4,785,948, eversion is prevented by rendering the heel thicker and rigid so that in attempting to bulge axially outward under pressure the base will be kept from doing so by the rigidity of the heel. This means that the entire heel region is rigid and any bulging of the heel plus conical part 46 is prevented.

However, compared to the known art, in the configuration of the present invention, the rigid, thickened portion is placed inwards to the hinge portion, leaving the heel and adjoining side wall flexible, even while preventing eversion. As a result, upon pressurizing the bottle, the heel and side wall will move outward and down forming an increased and more stable standing section while eversion is still prevented. The result is limited stability of the bottle in the empty, unpressurized state and substantially enhanced stability when pressurized due to rolling out of the heel, all without eversion of the base, which is precluded by the thickened hinge.

A thickened region will have reduced orientation, even with the improved design represented by U.S. Pat. No. 4,785,948. This in turn means reduced impact resistance, i.e., brittleness. Fortuitous impact loads occur usually near the heel and hardly ever near the center. Thus, brittleness near the center is tolerable, while brittleness near the heel is not. In accordance with the present invention orientation at the heel and therefore ductility are increased due to the placement of the thickened portion well inward.

Figure 7:
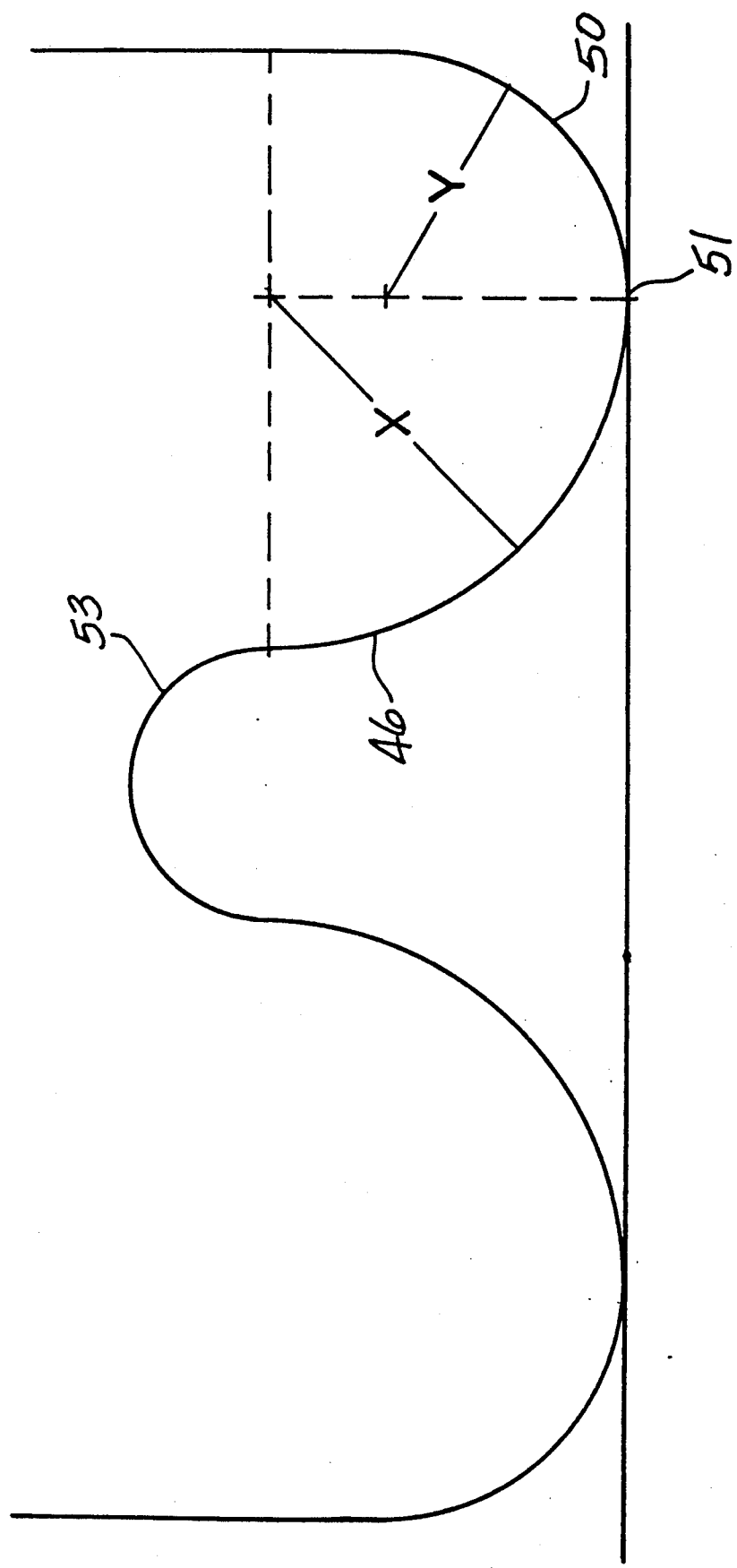
FIG. 7 is a schematic illustration of the bottom portion and adjacent tubular body portion of the container of FIG. 4 in the empty condition illustrating the radius of curvature of the hinge portion and the radius of curvature of the conical portion.

As schematically illustrated in FIG. 7 for the container in the empty condition, conical portion 46 includes a radius of curvature X between upper region 53 and standing section 51, and heel portion 50 also has a radius of curvature Y. A representative embodiment for a two liter container in the empty condition is radius X varying from 24 to 27 mm and radius Y varying from 17 to 20 mm. In accordance with the present invention the ratio of radius X to radius Y should be from 0.75 to 2 and preferably from 1 to 1.6. It has been found that maintaining this ratio will enhance the stability of the bottom portion of the container.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A blow molded, biaxially oriented plastic container comprising a neck portion defining an opening; a tubular body portion depending therefrom; an integral bottom portion depending from the tubular body portion; an axially, inwardly directed, generally conical portion of said bottom portion having an upper region thereof, wherein said bottom portion includes a standing section on which the container rests in the upright condition; wherein said bottom portion includes a heel portion joining the standing section and the body portion and a hinge portion joining the conical portion and the standing section; said container having means including a hinge portion wall thickness greater than the heel portion wall thickness wherein said heel portion is spaced outward and downward upon pressurizing the container to provide a stable bottom portion and wherein the standing section of said container upon pressurizing is larger than the standing section in the unpressurized container so as to form a stable standing section and wherein the heel portion has a radius of curvature and the conical portion has a radius of curvature between the upper region and the standing section with the ratio of the radius of curvature of the heel portion to the conical portion varying from 0.75 to 2.0.

2. A container according to claim 1 wherein the hinge portion has a greater wall thickness than the body portion.

3. A container according to claim 1 with the wall thickness of the hinge portion being greater than the wall thickness of the upper region of the conical portion.

4. A container according to claim 1 wherein the container has continuous alterations in wall thickness with a regularly undulating cross section, wherein said continuous alterations in wall thickness are provided on the tubular body portion adjacent the bottom portion and extending onto the bottom portion.

5. A container according to claim 1 wherein said bottom portion standing section is converted from a standing section radius to a standing section surface upon pressurizing.

6. A container according to claim 1 wherein the ratio of wall thickness of the heel portion to the hinge portion is approximately 1:10.

7. A container according to claim 1 wherein the standing section, hinge portion, heel portion and conical portion all have a curved configuration.

8. A container according to claim 3 wherein the heel portion is thicker than the upper region of the conical portion.

9. A container according to claim 1 wherein the heel portion wall thickness is greater than the body portion.

* * * * *